No. 814,100. PATENTED MAR. 6, 1906.
G. WEBSTER.
DEHORNER.
APPLICATION FILED NOV. 2, 1905.
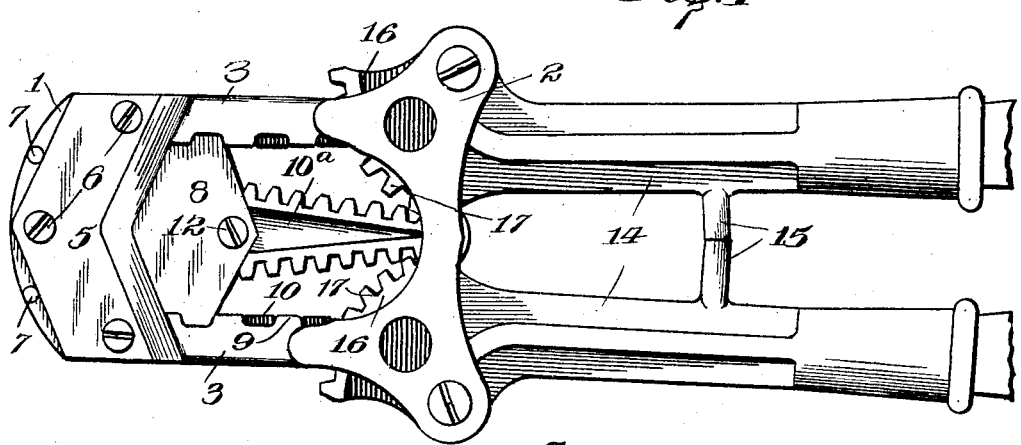
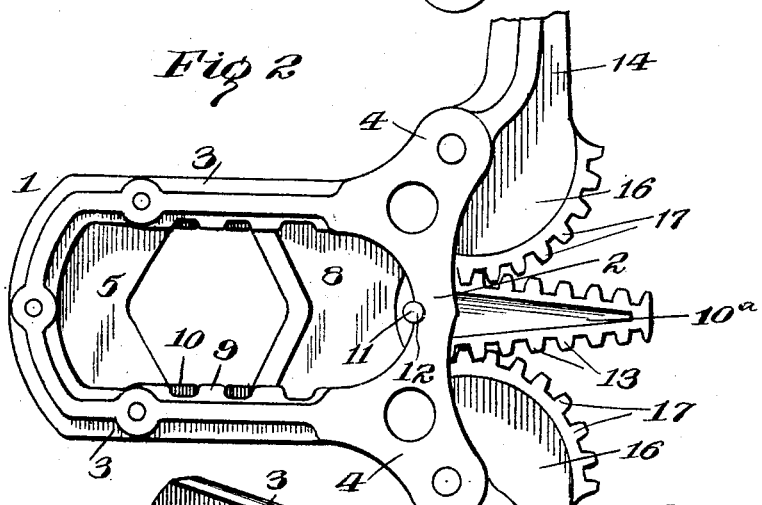
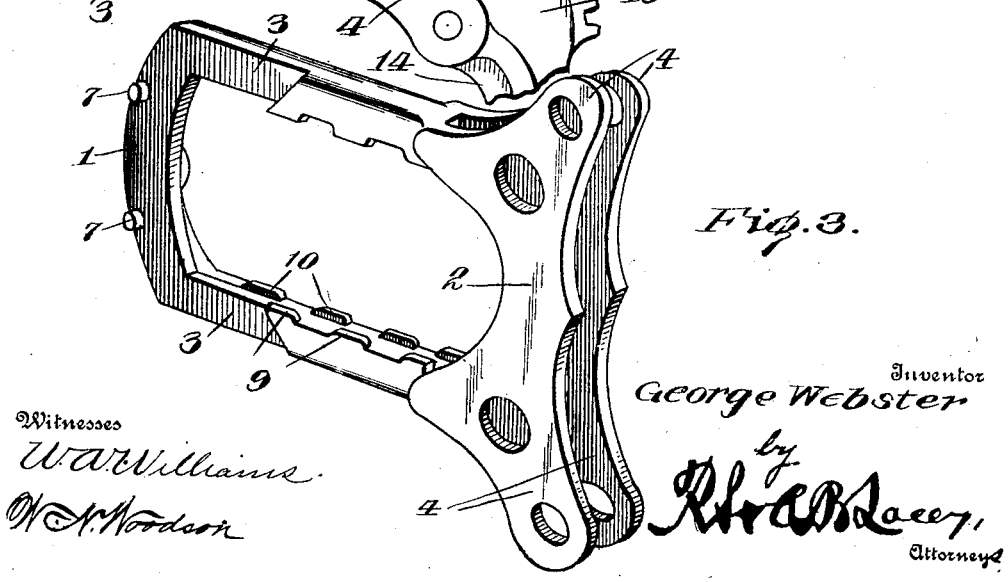
Witnesses
W. A. Williams
W. N. Woodson
Inventor
George Webster
by
R. & A. B. Lacey,
Attorneys

UNITED STATES PATENT OFFICE.

GEORGE WEBSTER, OF CHRISTIANA, PENNSYLVANIA, ASSIGNOR TO MORRIS T. PHILLIPS, OF POMEROY, PENNSYLVANIA.

DEHORNER.

No. 814,100.     Specification of Letters Patent.     Patented March 6, 1906.

Application filed November 2, 1905. Serial No. 285,646.

*To all whom it may concern:*

Be it known that I, GEORGE WEBSTER, a citizen of the United States, residing at Christiana, in the county of Lancaster and State of Pennsylvania, have invented certain new and useful Improvements in Dehorners, of which the following is a specification.

This invention provides a novel form of implement for removing the horns of cattle, the object being to devise a tool for this purpose which will be capable of efficient and rapid work and easy of operation.

The invention resides chiefly in the general structure of the device whereby the fixed blade is stayed, the movable blade guided and held in place, and the levers mounted so as to equalize the strain.

The invention also resides in the peculiar operating means whereby the effective leverage of the actuating means constantly varies as the work progresses.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a side view of a dehorner embodying the invention, showing the relation of the parts when the blades are closed. Fig. 2 is a view similar to Fig. 1 of the implement as seen from the reverse side, showing the relation of the parts when the blades are open. Fig. 3 is a detail perspective view of the frame stripped.

Corresponding and like parts are referred to in the following description and indicated in all the views of the drawings by the same reference characters.

The frame to which the operating parts are attached is preferably of oblong form and comprises end bars 1 and 2 and side bars 3, the end bar 2 and the adjacent portions of the side bars being composed of transversely-spaced parts to receive between them the pivot-pins of the operating-levers and the shank of the movable blade. Lugs 4 project outward from the lower corners of the frame, and the operating-levers are pivoted thereto. The end bar 1 and the adjacent end portions of the side bars 3 are cut away upon one side to form a seat for the fixed blade 5, thereby admitting of the two blades sliding the one upon the other in the operation of the tool. The cutting edge of the fixed blade is indented or approximately of V form, so as to operate by a shear cut. Screws 6 or like fastenings are employed for attaching the blade to the frame in a manner to admit of its removal for sharpening or any other desired purpose. Lugs 7 project laterally from the end bar 1 and engage with the outer edge of the fixed blade and serve in a great measure to relieve the fastenings 6 of the strain imposed upon the blade when the tool is in operation.

The movable blade 8 is similar in construction to the fixed blade, its cutting edge being indented and approximately of V form. The movable blade is held in place and directed in its movements by suitable guides applied to the inner edges of the side bars 3, said guides in the preferable construction consisting of lugs 9 and 10, which have an alternate or staggered arrangement to admit of the frame being readily cast. The lugs 9 upon one side of the movable blade are arranged opposite to the spaces formed between the lugs 10 upon the opposite side of said blade, and these lugs are constructed in a manner to admit of the casting drawing. The space between the lugs forming the guideway for the movable blade is in communication with the space formed between the complemental parts of the end bar 2, thereby admitting of the blade 8 being slipped into position from below or between the members of said bar 2 and likewise withdrawn in a similar manner when it is required to move it for sharpening or other desired purpose. A shank $10^a$ projects from the lower or outer edge of the movable blade and occupies a medial position. This shank is preferably separate and distinct from the movable blade and depressed throughout its length, the wider end being adjacent to the blade. A lug 11 projects from the wide end of the shank $10^a$ and comes alongside of the blade 8 and receives the fastening 12, by means of which the blade is connected to the shank. The fastening 12 projects so as to engage with the end bar 2 and limit the outward movement of the blade 8, the projecting portion of said fastening constituting a stop, which likewise limits the outward movement of the operating-levers when moved apart at their outer ends. Opposite edges of the shank 10ª are toothed, as shown at 13, to mesh with corresponding teeth upon the cam ends of the operating-levers. The operating-levers 14 are pivoted at their inner ends to the lugs 4 and are provided upon their inner edges with stops 15, which limit their inward movement when closing the blades when bringing the outer ends of the operating-levers together. A cam 16 is provided at the pivotal end of each projecting lever, and the portion coöperating with the shank is toothed and formed on a curved line to maintain the teeth in proper meshing relation throughout the movement of the operating-levers both in opening and closing. The teeth 17, formed upon each cam 16, are of a size to mesh with the teeth 13, so as to obviate lost motion and insure perfect matching of the teeth in the operation of the tool. The cam ends of the levers, as well as the shank 10ª, operate in the space formed between the members or parts comprising the bar 2 and are thereby prevented from lateral displacement and result in equalizing the strain upon every portion of the frame and working parts.

The tapered form of the shank 10ª and the cam formation of the inner ends of the operating-levers result in the provision of an effective differential leverage in the operation of the tool, said leverage continually varying as the blade 8 moves in the progress of the work.

Having thus described the invention, what is claimed as new is—

1. In an implement of the character set forth, the combination of a frame provided with a fixed blade, a movable blade mounted upon the frame for coöperation with the fixed blade and having a tapered shank extended therefrom and toothed upon opposite edges, and operating-levers pivoted to said frame and having toothed cam portions adapted to coöperate with the toothed portions of the said shank.

2. In an implement of the character specified, the combination of a frame provided with a fixed blade, a movable blade, a shank having a portion overlapping the movable blade, a fastening connecting said shank to the blade and having a portion extended to provide a stop to limit the outward movement of the blade, and actuating means for operating the movable blade.

3. The herein-described dehorning implement, the same comprising an oblong frame having an end portion reduced to form a seat and having laterally-extended lugs and having the opposite end portion composed of transversely-spaced parts, and provided with lugs at the inner lower corners and having lugs upon the inner edges of the side bars to form guideways, the lugs upon one side alternating with the lugs upon the opposite side, a blade secured upon the aforementioned seat, a movable blade operating in said guideways, a tapered shank projected from the movable blade and having its inclined edges toothed, and operating-levers pivoted to the aforesaid lugs and having cam portions at their pivotal ends toothed to match with the teeth of said shank, the shank and toothed cams operating in the space formed between the separate parts at one end of the frame.

In testimony whereof I affix my signature in presence of two witnesses.

GEORGE WEBSTER. [L. S.]

Witnesses:
  J. A. HARRAR,
  NORA H. HARRAR.